US005837338A

United States Patent [19]

Rich et al.

[11] Patent Number: 5,837,338

[45] Date of Patent: Nov. 17, 1998

[54] MULTI-PLY LABEL CONTAINING REMOVABLE PIECES

[75] Inventors: Benny R. Rich; Frank Joseph Tortorici, Sr., both of Oakwood; Jerome P. Jacobson, Duluth; James J. Carides, Lawrenceville; David M. Good, Peachtree City, all of Ga.

[73] Assignee: Dittler Brothers Incorporated, Atlanta, Ga.

[21] Appl. No.: 681,211

[22] Filed: Jul. 22, 1996

[51] Int. Cl.[6] .......... B32B 3/10; B32B 7/06

[52] U.S. Cl. .......... 428/42.3; 428/43; 428/194; 283/81; 283/94; 283/103; 283/105; 283/101

[58] Field of Search .......... 428/42.3, 43, 194; 283/81, 94, 103, 105, 101, 102

[56] References Cited

U.S. PATENT DOCUMENTS

| | | | |
|---|---|---|---|
| 3,900,219 | 8/1975 | D'Amato et al. | 283/903 |
| 4,726,608 | 2/1988 | Walton | 283/102 |
| 4,850,618 | 7/1989 | Halladay | 283/102 |
| 4,911,477 | 3/1990 | Shishido | 283/81 |
| 5,056,827 | 10/1991 | Sasso | 283/81 |
| 5,125,689 | 6/1992 | Heninger | 283/106 |
| 5,403,636 | 4/1995 | Crum | 428/40 |
| 5,520,760 | 5/1996 | Freedman | 156/152 |
| 5,562,964 | 10/1996 | Jones | 428/43 |

OTHER PUBLICATIONS

Copy of sample McDonald's "Splash for Cash" Game Stamp (copyright Dec. 1988).

*Primary Examiner*—Alexander Thomas
*Attorney, Agent, or Firm*—Dean W. Russell; Kilpatrick Stockton, LLP

[57] ABSTRACT

A label comprised of at least two coupled plies is disclosed that incorporates a removable game on the inside face of an outer ply. The outer ply is adhered to an inner ply along two of its edges. The game piece, which is printed to the inside face of an outer ply between the two adhered edges of the outer ply, is removable from the label by sequentially tearing the game piece from the two edges. A suitable label construction is further disclosed in which the game piece incorporates removable scratch off coatings.

23 Claims, 2 Drawing Sheets

MULTI-PLY LABEL CONTAINING REMOVABLE PIECES

FIELD OF THE INVENTION

This invention relates to multi-ply labels and more particularly to multi-ply labels that contain removable promotional game pieces.

BACKGROUND OF THE INVENTION

An existing label used in connection with promotional games includes two plies. One ply, forming the base of the label, has an underside to which a pressure-sensitive adhesive is affixed. The opposing side of the base, the face, contains no adhesive, and may be printed with promotional or other material. In use, the underside of the base is attached to a substrate such as a paper beverage cup sold in retail outlets.

The second ply, which similarly includes a face and an underside, overlays the base of the label. The second ply contains three parallel regions that extend along the length of the ply and are separated by two parallel rows of perforations. The underside of the outer two regions contains an adhesive that couples the underside of the second ply to the face of the base ply. Between the outer regions is an intermediate region. The game piece, which contains information concerning the prize to be awarded for a particular promotion, is printed on the underside of the intermediate region. The face of the second ply may have promotional information and game-playing instructions printed thereon.

To play the promotional game a player separates the intermediate region of the second ply from the outer regions by detaching it along the perforations. Doing so exposes the surface of the game piece containing the prize information and informs the player of the result of the promotion.

Retailers use promotional labels to entice customers to purchase the product to which the promotional label is affixed and to advertise the retailer's products. A larger label that provides greater printing space than an existing label provides is thus desirable and advantageous. The retailer can use the additional printing space to market better its products; the retailer can include additional verbiage to inform players better how to manipulate the pieces of a label or to play the game according to the rules; or the retailer can simply increase the size of the lettering and images on the label to enhance the appearance, readability, and effectiveness of the promotional label. A larger label could also incorporate a game card that contains multiple scratch-off coatings. These type game cards are often distributed at retail establishments where, by virtue of their shape and size, they can be stolen or surreptitiously distributed in bulk quantities. By incorporating the game card into a label that is affixed, for instance, to a paper beverage cup, a retailer can reduce significantly the possibility that the game cards it has purchased for a promotion can be circulated or disseminated indiscriminately or improperly.

Larger labels are not, however, without their functional difficulties, especially when constructed in the form of the existing label discussed above. Consumers have difficulty separating the plies without tearing or crumpling the game piece, especially when paper is used to construct the label. Paper, which is a material of choice for promotional labels, tears readily when pulled in certain directions. Larger pieces of paper that are contained in larger labels tear even more readily than small pieces of paper. When removing a game piece from a larger label, therefore, a consumer must exercise extreme care, both in the selection of a location for gripping the game piece and in the manner in which the game piece is torn from the label, in order to avoid tearing the game piece before having torn the rows of perforations which separate the game piece from the label.

Because paper best resists tearing against forces that are applied in directions that are horizontal to the paper plane, and paper least resists tearing against forces that are applied in directions that are perpendicular to the paper plane, undesirable tearing can occur when, for instance, a player exerts horizontal forces to the weakened perforated portions of the label and vertical forces to other portions of the game piece. Large labels affixed to the exterior of rounded cups are especially prone to tearing because the direction of the force that will tear the game piece varies according to the location of the game piece on the cup at which the force is applied. For a label that wraps around half of a cup the direction of the minimal force that will initiate tearing can vary by 180°.

Many consumers do not understand the interaction of these forces and are unable to remove game pieces from large labels without first tearing them. Even those consumers who do understand these forces are frequently unable to remove large game pieces from non-planar surfaces without tearing the piece. If a player successfully removes a large game piece from a label without tearing it, the game piece is likely to have been crumpled. Crumpling can occur when, for instance, a consumer who is knowledgeable about the interaction of paper and shear forces manipulates the shape of the game piece to align a vertical force applied to the game piece with the perforations in a label. Crumpling, wrinkling, or tearing is undesirable in the context of promotional labels which frequently contain collectible pieces or games that are aesthetically or functionally compromised when torn or crumpled.

Promotional labels that contain game pieces with multiple scratch-off coatings pose further manufacturing difficulties because of the extreme conditions to which promotional labels are exposed. The conditions under which paper beverage cups are manufactured and coated with wax or polyethylene typify the conditions to which a promotional label can be subjected. Promotional labels are affixed to paper cups during the manufacture of the cup. The labels are usually adhered to the cup surface before the cup has been formed out of a sheet of boardstock and before any hot wax has been applied to the sheet. The temperature at which the wax is applied, typically above 180° F., can cause the coating to melt and streak along the face of the game piece, or to "block," that is transfer from the game piece onto the face of the base ply. Polyethylene laminated cups are produced under comparably high temperatures. Metallic latex coatings that are commonly used as scratch-off coatings are especially prone to these heat-induced effects. Pressure is applied to the scratch-off coating during manufacture and subsequent processing, stacking and packaging that may also cause the coating to block. A promotional label that contains a removable game piece with a scratch-off coating that can endure the extreme conditions to which promotional labels are often subjected would thus be highly desirable.

The molten wax that is applied to paper beverage cups causes other problems as well. Hot wax can seep through the perforations in the label, or it can seep through breaks in adhesion between plies, if the plies are not secured together around their entire periphery. "Crow's feet," which are often incorporated into perforations to facilitate tearing, act as carriers for the hot wax to the inward portions of a label. Hot wax can even seep through the porous material that is often used to construct promotional labels. Besides creating an aesthetically unappealing product, hot wax which has seeped between or through layers causes a number of functional problems. The hot wax can cause the scratch-off coating to block, and it can compromise the adhesion of a scratch-off coating to a game piece or the ease with which the scratch-off coating can be removed.

Multi-ply labels also present various security and handling problems. In particular, a game piece that is coupled with the label by adjacent and supporting portions may be expected typically to extend from the promotional label roughly in the form of a tab to permit a player more easily to detach the game piece from the label. In situations in which a label is applied to a pliable (as opposed to a rigid) surface, or where the game piece is comparatively large, it may become temptingly easy for a party to peek at the inner surface of the game piece by "bowing" or otherwise distorting the surrounding pliable material or the game piece. A mechanism to preclude manipulation of a label, a game piece, or a mounting surface to compromise the game is thus highly desirable.

It is an object of this invention, therefore, to provide a label from which a game piece is readily detachable without being torn or crumpled.

It is a further object of this invention to provide a promotional label that incorporates a removable game piece that contains playable scratch-off coatings.

It is another object of this invention to provide a label that resists the seepage of hot wax and withstands the extreme temperatures at which hot wax is applied.

It is a still further object of this invention to provide a promotional label that is resistant to tampering and manipulation which compromises the game prematurely.

Other aspects, objects and advantages of the invention will become apparent to those skilled in the art upon reference to the remainder of this document.

SUMMARY OF THE INVENTION

The label of the present invention accomplishes many of these objectives by a novel sequential decoupling configuration. The present label is comprised of two plies, a base ply that is adhered to a substrate such as a beverage cup, and a second ply, a portion of which is adhered to the base ply. The second ply is separable into four regions—a first edge, a second edge, a strip, and a centerpiece. The four regions are defined by three rows of perforations that transect the second ply and which, when torn, allow the regions to be separated. The first and second edges traverse the length of the second ply, running parallel along two peripheral boundaries of the second ply. These edges are coupled securely to the base ply by a suitable adhesive. Between the two edges, and adjacent to the first edge, is the third region, a strip, that also traverses the length of the second ply. The fourth region, the centerpiece, lies between and adjacent to the strip and the second edge.

The strip has a tab that extends generally beyond the outer periphery of the second ply. By grasping and pulling the tab one is able to tear the rows of perforations that couple the strip to the first edge and the centerpiece and thereby remove the strip from the second ply. Removal of the strip from the second ply also decouples one edge of the centerpiece from the label, which enables a consumer to grasp the decoupled edge of the centerpiece, pull the centerpiece away from the base ply, and view the game piece. The consumer can rotate the centerpiece about the row of perforations that separates the centerpiece from the second edge to view the game piece, or can thereafter tear the game piece from the label along the row of perforations that separates the centerpiece from the second edge.

The present label optionally may comprise a third ply that is intimately bound to the exposed face of the second ply. Such third ply advantageously may take the form of a plastic laminate. Like the second ply, the third ply is separable into four regions along three rows of perforations. The four regions correspond to the regions defined in the second ply, approximate the geometry and size of the regions defined in the second ply, and are coupled with the regions of the second ply to which they correspond. The plastic laminate imparts strength, tear resistance, wrinkle resistance, and heat resistance to the regions of the second ply. In addition, the optional plastic laminate creates a more aesthetically pleasing label.

A separate embodiment of the present invention comprises a promotional label that contains a game piece with a playable scratch-off coating. A series of release coatings, protective coatings and laminates may advantageously be incorporated into the label to protect the scratch-off coating from the harsh conditions to which it is subjected and to ensure that the coating can be readily removed by a consumer who has obtained the promotional label.

In another embodiment of this invention the label is constructed with modified perforation schemes or designs. A perforation row typically includes weakened or fully-perforated perforations that alternate with intact or "tie" portions that provide the primary or total resistance to separation along the perforation row. The ratio of the length of perforations in a row to the length of tie portions in the row represents what is commonly known as the "cut-to-tie ratio." The cut-to-tie ratio can be manipulated to affect the ease with which the perforations are burst at any particular point along the row of perforations. In one embodiment of the present invention the cut-to-tie ratio varies along the length of the rows of perforations that separate the centerpiece from the label. Such variation causes a row of perforations to tear most readily in the middle of the row, and to tear least readily at the ends of the row.

Another embodiment of the present invention incorporates directional perforations. It has been found that the shape and direction of the perforations in the second ply influence the degree to which hot wax seeps into and contaminates a game piece. Limiting the perforations in a label to those that do not extend inwardly toward the game piece has proven effective to prevent wax from seeping through the perforations into the game piece portion of the label. Perforations that do not extend inwardly toward the game piece are, accordingly, incorporated into one embodiment of this invention.

According to another embodiment of the present invention a strip of releasable adhesive is applied between the base and second plies, extending generally from the first edge to the second edge. The adhesive prevents a party from peeking at the inner surface of a game piece by bowing or otherwise distorting the surrounding pliable material or the game piece. The adhesive strip also inhibits the migration of wax or other material between the layers of the label.

The various aspects of the present invention may be understood by referring to the accompanying drawings, as well as to the remainder of the text of this specification.

DETAILED DESCRIPTION

Figure 1:
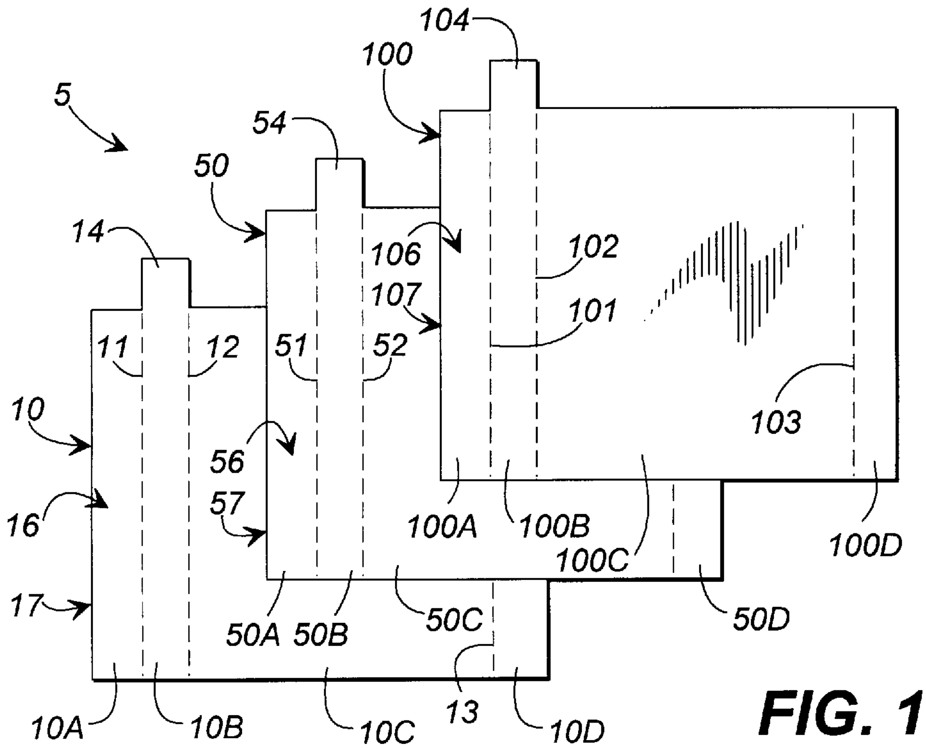
FIG. 1 is an exploded bird's-eye view of a three-ply promotional label according to the present invention having a detachable game piece in which the base ply is lowermost.

One aspect of the present invention relates to the means by which a detachable game piece is removed from a promotional label. It has been found that a game piece that is coupled to a label along two opposing edges can be removed from the label without being torn if the opposing edges are separated from the label one after the other. Referring particularly to FIG. 1 there is shown a label from which the game piece can be removed by the sequential tearing of the two edges that couple the game piece to the label.

FIG. 1 shows a three-ply label 5 in exploded form. A first or base ply 10 is formed of a material having sufficient strength to bear additional plies, to anchor those plies to a substrate surface (not shown), and to retain portions of the label 5 even upon manual removal of other portions. Base ply 10 has a face 16 and an underside 17. Underside 17 is provided with an adhesive of sufficient strength to retain it and any attached plies to a temporary holding surface (from which at least a portion of the label 5 is eventually to be removed) and ultimately to a substrate, such as a soft drink cup, food wrapper, or other such product.

Ply 10 is divided into at least three portions. In the illustrated embodiment, ply 10 includes four portions: a first edge 10A, a strip 10B, a centerpiece 10C, and a second edge 10D. These portions are delineated from adjacent portions by weakened regions such as perforation rows 11, 12, and 13 that transect ply 10. As shown in FIG. 1, strip 10B is distinguished and manually separable from first edge 10A and centerpiece 10C by perforation rows 11 and 12, while centerpiece 10C is distinguished and manually separable from strip 10B and second edge 10D by perforation rows 12 and 13. In one embodiment the illustrated perforations and separability are optional because the base ply, once applied, typically will not need to be separated into its component parts. The perforations in ply 10 are shown, however, because they are an incident to the process by which multi-ply labels are often produced.

The geometry of the periphery of the label shown in FIG. 1 has certain features that are important to the functioning of the disclosed embodiment. In particular, the strip portion 10B of base ply 10 has a periphery that physically and visually distinguishes it from the remainder of label 5. In FIG. 1 the distinguishable periphery is a tab 14 of base ply 10 that protrudes beyond the adjacent edges of the label 5 corresponding to portions 10A, 10C and 10D.

A second ply 50 of label 5 includes face 56 and underside 57. The geometry of ply 50 is preferably similar and ply 50 itself is substantially equal in size to that of base ply 10. When ply 50 is laid over base ply 10, a first edge 50A of ply 50 overlies first edge 10A of base ply 10. Strip 50B is set off from first edge 50A by perforation row 51 and overlies strip 10B of base ply 10. Similarly, centerpiece 50C, set off from strip 50B by perforation row 52, overlies centerpiece 10C. Likewise, second edge 50D, set off from centerpiece 50C by perforation row 53, overlies second edge 10D of ply 10. A tab 54 is also preferably similar in geometry and size to the corresponding tab 14 of base ply 10. Specifically, tab 54 of strip 50B protrudes beyond adjacent edges of first edge 50A and centerpiece 50C and overlies tab 14. Although the geometry of ply 50 preferably corresponds to that of ply 10, the invention is limited neither to this particular geometry nor to strict correspondence between all dimensions of the plies or the regions of which the plies are comprised.

Centerpiece 50C typically contains a game piece, so that the underside 57 of centerpiece 50C is printed with game indicia of interest to players of the game. In addition, face 56 of ply 50 may also be printed with promotional information as well as game-related information because this is the surface to which consumers will be exposed prior to playing the game. The printing of the underside and face of the game piece will preferably occur before plies 10 and 50 are assembled into a functional promotional label.

Figure 4:
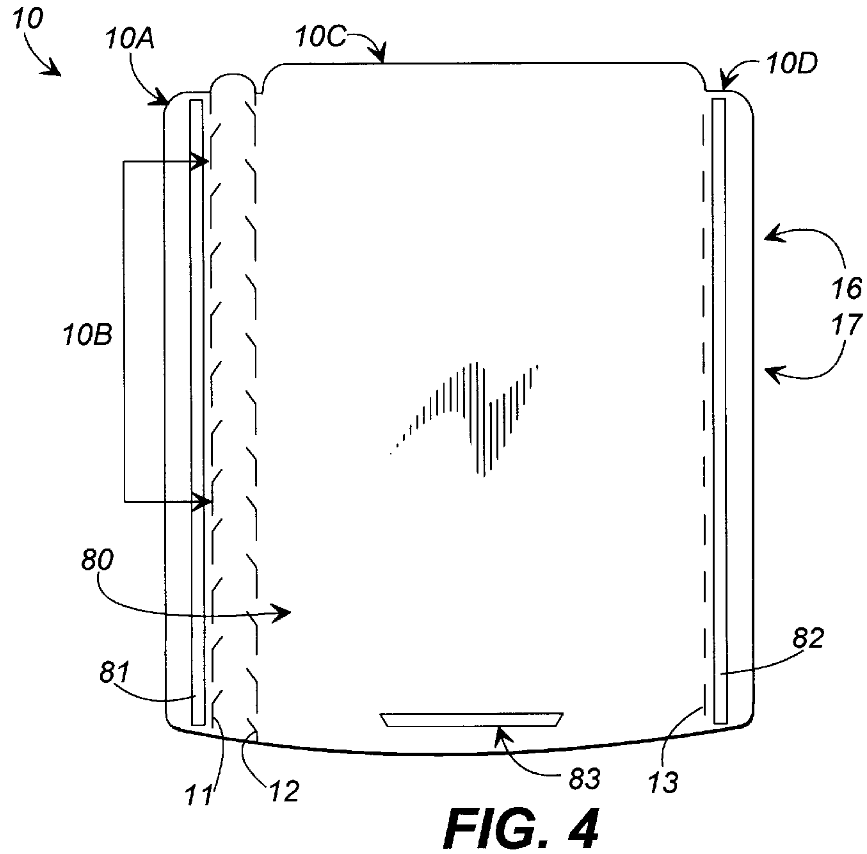
FIG. 4 is a plan view of the face of a first ply that is coupled to the underside of the second ply in FIG. 3 in a promotional label that includes a game piece having removable scratch-off coatings showing the location and geometry of coatings that can be incorporated.

In order to assemble plies 10 and 50 into a functional promotional label 5 the underside 57 of ply 50 at first and second edges 50A and 50D is coupled by suitable means to face 16 of ply 10 at first and second edges 10A and 10D. This coupling is preferably achieved by a known adhesive having sufficient strength to hold the first and second edges of plies 10 and 50 together while strip 50D or centerpiece 50C is being torn from the label 5 along perforation rows 51, 52, or 53. The locations of suitable adhesive strips are indicated in FIG. 4 and denominated as 81 and 82.

When label 5 has been assembled as described, and when the entire underside 17 of ply 10 has been adhered to a substrate, only tab 54 can be readily grasped and pulled. When a player grasps and pulls tab 54 the player tears perforation rows 51 and 52, permitting the strip 50B to be removed from the label 5 while leaving the remainder of the label intact. Once the strip 50B has been removed the game piece, contained on the underside of centerpiece 50C of ply 50, can be peeled from the label 5 and rotated about perforation 53. The game piece can then remain coupled to the label or, if preferred, centerpiece 50C can be grasped and pulled in order to tear perforation row 53 and separate the game piece from the label 5.

Figure 2:
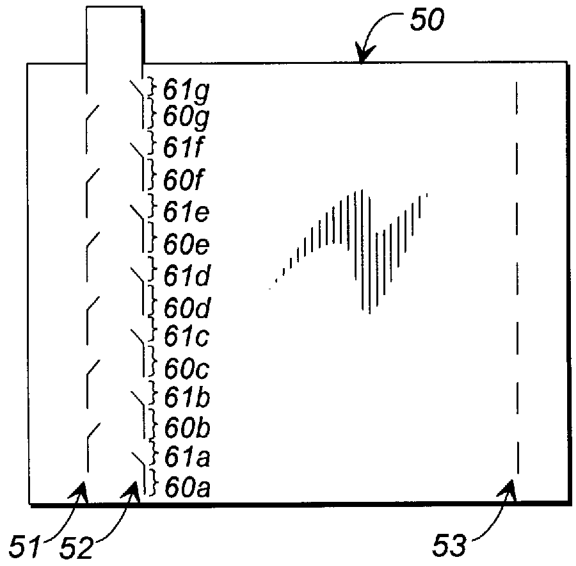
FIG. 2 is a top plan view of an alternative to the label of FIG. 1 and particularly indicates certain angular and linear dimensions of the perforations of the label.

The removal of strip 50B is facilitated by the geometry of the perforations that make up rows 51 and 52, as shown in FIG. 2. The perforations in rows 51 and 52 may advantageously extend inwardly as "crow's feet" from the rows of perforations so that the perforations will more easily engage when the strip is being removed and rows 51 and 52 are being torn.

The removable strip of the disclosed embodiment thereby achieves tear-free and wrinkle-free separation of the game piece from the label by allowing one to decouple the edges of a game piece from the label one edge at a time. It will be apparent to those skilled in the art that a game piece that is coupled to a label at more than one edge can be decoupled from the edges one after the other by means other than a removable strip. One such means, for instance, would be a string that is transposed between plies at the juncture of the game piece to the label which, when pulled, would tear through the second ply and thereby decouple the game piece from the label at one edge. The present invention is meant to encompass all such means by which a game piece can be decoupled from the label one edge at a time.

Moreover, while the foregoing discussion has focused upon a particular label as shown and described, the invention does not depend on any particular geometry. Labels may take any number of external shapes or dimensions and still be within the scope of this invention as long as they are consistent with the principles set forth in this document.

As further shown in FIG. 1, a separate embodiment of the present invention comprises a third ply 100 that is adhered to the face 56 of ply 50. Ply 100, like plies 10 and 50, includes a face 106 and an underside 107. Ply 100 also is comprised of four portions—100A, 100B, 100C, and 100D. As is the case with the portions of plies 10 and 50, portions 100A and 100B are distinguished and separable from one another along perforation row 101, portions 100B and 100C are distinguished and separable from one another along perforation row 102, and portions 100C and 100D are distinguished and separable along perforation row 103. Portions 100A, 100B, 100C and 100D, and rows 101, 102, and 103, generally overlay and correspond to their respective portion or row in ply 50. A tab 104 of portion 100B protrudes beyond adjacent edges of portions 100A and 100C and overlies tab 54. In one embodiment the illustrated perforations in ply 100 are optional if ply 100 is comprised of a material that tears readily when ply 50 is separated into its component pieces.

Ply 100 is advantageously a translucent or transparent laminate that is intimately and securely bonded to face side 56 of ply 50. Opaque laminates can also be employed depending upon the visual effect that is desired. A varnish may be substituted for a laminate if desired, depending upon the properties one desires from ply 100.

Any adhesive means that can intimately bond ply to the surface of ply 50 is suitable for constructing the label of the described embodiment. Such adhesion between plies 100 and 50 can be achieved by various means, depending partly upon the material chosen to form plies 50 and 100. Synthetic polymeric laminates, for instance, can be adhered to a ply 50 formed of cellulosic material by conventional heat lamination processes. Chemical adhesives can also be used to adhere the two plies together.

The ply 100 should be intimately bound to the surface of ply 50 so that ply 100 shares its desirable properties with ply 50. When ply 100 is comprised of a plastic laminate, ply 100 imparts significant strength to ply 50. Laminate strip 100B strengthens strip 50B of ply 50 to such a degree that when a player grasps and pulls tab 54 he can remove strip 50B without tearing strip 50B. Laminate ply portion 100C similarly strengthens centerpiece 50C of ply 50 to such a degree that after strip 50B has been removed a player can grasp and pull centerpiece 50C from ply 50 without tearing the game piece on the underside 57 of section 50C.

Because the laminate also strengthens perforation rows 52 and 53, however, the strengthened rows somewhat offset the strength that the laminate imparts to section 50B, thereby making it more difficult to remove strip 50B without tearing. It may be desirable, therefore, to offset the added strength in perforation rows 52 and 53 by modifying the cut-to-tie ratio of rows 52, 53, 102, and 103, as discussed below, to optimize the bond strength of rows 52, 53, 102, and 103 and to minimize the risk that a player will accidentally tear strip 50B during removal. Similarly, because the laminate strengthens perforation row 54 it may be desirable to modify the cut-to-tie ratio in rows 54 and 104 to minimize the risk that a player will accidentally tear the game piece during removal.

If a laminate is employed as portion 100C it also imparts other beneficial properties to centerpiece 50C. For instance, plastic laminates impart some rigidity, which reduces the potential for portion 50C to be bent or crumpled while it is being removed from label 5. A plastic laminate portion 100C also imparts to centerpiece 50C a degree of resiliency, which allows centerpiece 50C to return to its original shape and form if it is crumpled or bent. The resilient and rigid properties which laminates impart are particularly desirable in game pieces. Consumers desire collectible game pieces with rigid and resilient features because of the durability and longevity associated with these features. Retailers desire scratch-off games with rigid features because the scratch-off coatings can be compromised if the game piece is bent. Such bending is minimized, of course, by laminate ply portion 100C.

Figure 3:
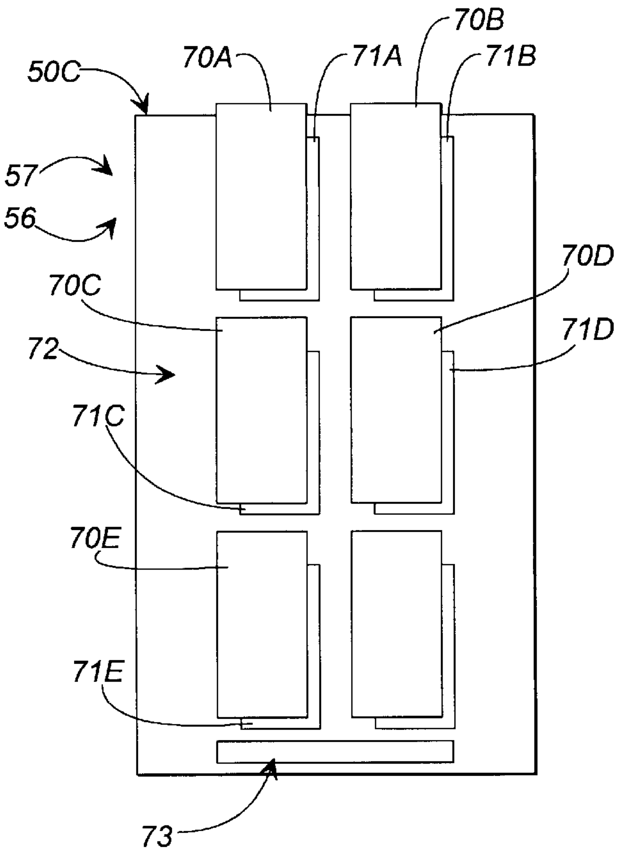
FIG. 3 is an exploded view of the underside of a second ply of a promotional label according to the present invention, in which a game piece having removable scratch-off coatings is shown.

In another embodiment of the present invention the promotional label contains a game piece on the underside of centerpiece 50C with playable scratch-off coatings. A suitable construction of a portion of such a promotional label is illustrated by FIGS. 3 and 4. FIG. 3 illustrates a suitable construction for the game piece on the underside 57 of centerpiece 50C. Six regions of scratch-off material, collectively labeled 71A–F, are shown in FIG. 3. Game indicia such as that described in allowed U.S. Pat. Application Ser. No. 08/407,185 now U.S. Pat. No. 5,569,902 (which application is incorporated herein in its entirety by this reference) is printed beneath the scratch-off material in an actual game piece. The scratch-off material can be comprised of any composition generally known to those in the art, although special scratch-off coatings that are resistant to the harsh conditions to which the coatings are often subjected can be employed advantageously. Metallic latexes are commonly employed in such applications because of their opacity, the adhesion between metallic latexes and game piece substrates, and the ease with which metallic latexes can be scratched off with a coin or other suitable object. A suitable scratch-off coating composition for the present invention has been found to contain 40–60% lactol spirits; 15–30% aluminum paste; 5–20% black latex; 5–20% Kraton G1652 (commercially available from KVK USA, 19A Home News Road, New Brunswick, N.J., 08901); and 5–20% of the combination of a suitable wetting agent, solvent, antioxidant, and zinc stearate. The foregoing scratch-off coating composition has proven particularly resistant to the adverse effects of heat and pressure, while also being sufficiently opaque and scratchable to function as a suitable scratch-off coating.

Release coatings can be employed advantageously in a label that contains a game piece with scratch-off coatings. FIG. 3 discloses a release coating 72 that can be applied to the face of the game piece between the underside 57 of second ply 50 and the scratch-off coating material in regions 71A–F. FIG. 4 discloses a release coating 80 that can be applied advantageously to the exposed face 16 of base ply 10. These release coatings 72 and 80 inhibit a scratch-off coating from unduly adhering to either the face 16 of the base ply 10 or the underside 57 of the second ply 50 when the scratch-off coating is heated or the label is exposed to pressure. The release coatings may serve other functions as well. The release coatings may insulate the scratch-off coatings from heat to which the label is exposed. The release coatings may also block migration of molten wax that may seep through porous plies 10 or 50. Suitable release coating compositions for the present invention contain alcohol-soluble polyamide resins and zinc stearate and may also contain silicon. As FIGS. 3 and 4 illustrate, one preferably should not apply the release coatings to the underside 57 of first or second edges 50A or 50D of the second ply 50, or the exposed face 16 of first or second edges 10A or 10D of the base ply 10, because the release coatings may interfere with the adhesion between these four portions.

Alternatively, the release coating may be a varnish cured by ultraviolet radiation to enhance the gloss of the label and further seal the layers of the label from contaminants or abrasion. Because this coating is not air-dried, it remains unfixed until exposed to ultraviolet radiation. Non-uniformities in the thickness of applied coating, therefore, remain amenable longer to correction, providing a smoother, glossier result than many air-dried coatings. Exemplary compositions for such a release coating include (by weight) approximately 55–66% monomer, 15–25% epoxy oligomer, 8–10% benzophenone and, if appropriate, various anti-foamants, flow/leveling agents, photo-initiators, and synergists. Because these components cross-link when exposed to ultraviolet radiation, this alternative release coating typically cures to a hard and durable finish. The alternative release coating may additionally include a colorant.

Still other features may help to overcome the difficulties encountered when constructing promotional labels with scratch-off coatings. FIG. 3 discloses six regions of overprint 70A–F that can be applied over each of the scratch-off coating regions 71A–F. Because the overprint material adheres more securely to the scratch-off coating material than to the release coating 80 on the face of base ply 10 it helps to assure that the scratch-off coatings adhere to the game piece when the game piece is detached from the label. The overcoat may further enable a consumer to scratch-off more cleanly the scratch-off material in regions 71A-F if molten wax is able to seep between plies 10 and 50.

The ply 100 is another feature that helps to overcome the difficulties of incorporating scratch-off game pieces into promotional labels. A plastic laminate ply significantly insulates the scratch-off coating from heat that might otherwise transfer through the label. Because a plastic laminate is substantially non-porous it also acts as a physical barrier that prevents molten wax from seeping through the label and contacting the scratch-off coating. Varnish can also be used in ply 100 to insulate the interior of the label from heat and molten wax.

FIG. 4 illustrates a still further embodiment of the present invention that addresses security problems associated with multi-ply game labels. For apparently the same reasons that multi-ply game labels are easier to rupture along a single perforation, it is believed that such labels are easier to violate by "bowing" or otherwise manipulating the label to create a space sufficient to permit viewing of game indicia. This problem is exacerbated by the placement of a promotional label on a pliable material, such as sandwich paper, a newspaper page, or the like, since the pliable substrate may be more easily manipulated to create the viewing space.

To overcome this problem, as shown in FIG. 4, another embodiment of the present invention applies an adhesive strip 83 to the face of section 10C of the base ply to couple the game-indicia-bearing surface of the underside of centerpiece 50C to the face section 10C. Because the surfaces are intended to be separable one should employ an adhesive that holds the adjacent plies together, but which forms a bond weaker than that provided by the perforation rows and that does not remove any portions of the plies to which the adhesive is applied. The adhesive does not need to be applied in the linear form disclosed in FIG. 4 at the bottom of the label, but could be applied in any other suitable manner. In addition, an overprint 73 may optionally be applied to the underside 57 of centerpiece 50C as shown in FIG. 3 in corresponding relation to the adhesive strip 83 to facilitate separation of plies at the adhesive strip, and to prevent migration of molten wax into the label.

FIG. 2 illustrates a separate embodiment of the present invention that inhibits premature or accidental tearing of the perforation rows in a label by a perforation scheme such as illustrated by rows 51, 52 and 53. FIG. 2 depicts an advantageous perforation scheme for the described invention wherein the cut-to-tie ratio is shown to vary along the length of a row of perforations so that the segments in the row of perforations that have a high cut-to-tie ratio are more easily torn than other segments that have a low cut-to-tie ratio.

In one embodiment of the present invention the cut-to-tie ratio is greatest in the middle of a row of perforations in order to minimize the risk of accidental or premature rupture of perforations at the ends of the rows. In the perforation row 52 of ply 50 shown in FIG. 2 the lengths of the perforations at the end regions of the perforation row 52 are shown to be shorter than the lengths of the perforations in the middle of perforation row 52. Perforations 60A and 60G, at the end regions of perforation row 52, are shorter than perforations 60D and 60E in the middle of perforation row 52. The length of the tie portions also varies along perforation row 52. For instance, tie portions 61A and 61F in the end regions of perforation row 52 are longer than tie portions 61C and 61D in the middle region of perforation row 52. Both the tie length and the cut length affect the cut-to-tie ratio and the strength of a row of perforations. Therefore, whether the tie lengths are greatest toward the end regions of the perforation row, or the perforation lengths are greatest in the middle of the perforation row, the described embodiment is achieved because it is hardest to tear the perforation row at the ends and easiest to tear it in the middle.

For convenience only the juncture of portions 50B and 50C at row 52 has been discussed. However, the foregoing discussion is equally applicable to the juncture of portion 50A with portion 50B, 50C with portion 50D, and, more generally, any juncture between portions of a promotional label such as label 5 that are to be separated along a weakened region.

A still further embodiment of this invention relates to the geometry of perforations in row 53 as shown in FIG. 2. As previously discussed, perforations that extend inwardly toward the game piece act as carriers for molten wax. These inward perforations are often desirable because they increase the ease with which a row of perforations can be torn. In FIG. 2 rows 51 and 52 are shown to contain such inward perforations. Because the sequential decoupling feature of the present invention makes it easier to tear row 53 after one edge of the game piece has been decoupled, however, row 53 can be advantageously constructed without inward perforations thereby to minimize the migration of wax.

The above described features of the present invention, which inhibit and prevent accidental tearing of game pieces when they are removed from promotional labels, may be incorporated into the construction of any label where such accidental tearing is not wanted. Thus, while the features have been described as particularly desirable with large labels, the features may be incorporated into a label of any size and the scope of the invention is intended to cover all such sizes. Indeed, the foregoing is provided only for purposes of illustrating, explaining, and describing embodiments of the present invention. Modifications and adaptations to theses embodiments will be apparent to those skilled in the art and may be made without departing from the scope and spirit of this invention.

What is claimed is:

1. A label comprising:

a. a base ply comprising:

i. an underside suitable for adhesion to a substrate; and ii. an opposed face; and b. a second ply comprising:

i. an underside and opposed face;

ii. a first edge region having an underside adhered to the opposed face of the base ply;

iii. a second edge region having an underside adhered to the opposed face of the base ply;

iv. a centerpiece region coupled to the first and second edge regions and having an underside; and v. means for decoupling the centerpiece region sequentially from the first and second edge regions to expose the underside of the centerpiece region;

wherein the decoupling means of the second ply comprises:

a strip region, defined by two transecting parallel rows of perforations, that separates the centerpiece region from the first edge region and couples together the centerpiece and first edge regions; and a transecting row of perforations that separates the centerpiece and second edge regions;

wherein a ratio of the length of perforations to the length of spacing between perforations varies along at least one of the rows of perforations and the ratio is greatest in the middle of at least one row of perforations.

2. The label of claim 1 further comprising a laminate covering at least a portion of the opposed face of the second ply, and being transected by rows of perforations that overlay the rows of perforations transecting the second ply.

3. The label of claim 1 wherein the perforations in the row of perforations that separates the centerpiece and second edge regions extend in the same direction along a straight line.

4. The label of claim 1 wherein at least a portion of the underside of the centerpiece region is releasably adhered to the opposed face of the base ply.

5. The label of claim 1 wherein a portion of the strip region extends generally beyond the outer periphery of the second ply in the form of a tab.

6. The label of claim 5, further comprising a third ply having a first edge region, a strip region, a centerpiece region, and a second edge region overlying and registered with the first edge region, strip region, centerpiece region, and second edge region of the second ply, respectively, wherein the strip region of the third ply includes a tab aligned with the tab of the second ply.

7. The label of claim 1 further comprising game indicia printed on the underside of the centerpiece region of the second ply.

8. The label of claim 7 wherein a scratch-off material is coated over at least a portion of the game indicia.

9. The label of claim 8, further comprising an overprint material applied over the scratch-off material.

10. The label of claim 7, further comprising a release material applied over the game indicia.

11. The label of claim 1, further comprising a release material applied to the underside of the second ply.

12. The label of claim 1, further comprising a scratch-off material applied to the underside of the second ply.

13. The label of claim 12, further comprising an overprint material applied over the scratch-off material.

14. The label of claim 1, further comprising an adhesive between the opposed face of the base ply and the underside of the second ply.

15. The label of claim 14, further comprising a release material positioned between the adhesive and one of the base ply or the second ply.

16. The label of claim 1, further comprising a third ply having an underside and an opposed face and formed with a first edge region, a centerpiece region, and a second edge region, the centerpiece region being separated from the first and second edge regions by rows of perforations and wherein the first edge region, centerpiece region, and second edge region of the third ply are positioned in alignment over the first edge region, centerpiece region, and second edge region of the second ply.

17. The label of claim 16, wherein the third ply comprises a laminate.

18. A label comprising:

a. a base ply comprising:

i. an underside suitable for adhesion to a substrate;

ii. an opposed face;

iii. a first release coat applied to the opposed face; and b. a second ply comprising:

i. an underside and opposed face;

ii. at least one edge region having an underside adhered to the opposed face of the base ply;

iii. a centerpiece region coupled to the edge region and having an underside with game indicia printed thereon;

iv. a second release coat applied over the game indicia;

v. scratch-off material coated over the second release coat;

vi. an overprint printed over the scratch-off material; and vii. a protective coating applied over the opposed face of the second ply.

19. The label of claim 18 wherein the scratch-off material is comprised of the reaction product of 40–60% lactol spirits; 15–30% aluminum paste; 5–20% black latex; 5–20% Kraton G1652; and 5–20% of a combination of zinc stearate and at least one each of a wetting agent, solvent, and antioxidant.

20. The label of claim 18 wherein the protective coating is selected from the group consisting of varnishes, polyamide resins, and plastic laminates.

21. The label of claim 18 wherein the first and second release coats are selected from the group consisting of varnishes and polyamide resins.

22. A label comprising:

a base ply comprising:

i. an underside suitable for adhesion to a substrate; and ii. an opposed face; and b. a second ply formed of paper comprising:

i. an underside and opposed face;

ii. a first edge region having an underside adhered to the opposed face of the base ply;

iii. a second edge region having an underside adhered to the opposed face of the base ply;

iv. a centerpiece region coupled to the first and second edge regions and having an underside: and v. means for decoupling the centerpiece region sequentially from the first and second edge regions to expose the underside of the centerpiece region;

the label further comprising a release material applied on at least a portion of the opposed face of the base ply.

23. A label comprising:

a. a base ply comprising:

i. an underside suitable for adhesion to a substrate; and ii. an opposed face; and b. a second ply formed of paper comprising:

i. an underside and opposed face;

ii. a first edge region having an underside adhered to the opposed face of the base ply;

iii. a second edge region having an underside adhered to the opposed face of the base ply;

iv. a centerpiece region coupled to the first and second edge regions and having an underside; and v. means for decoupling the centerpiece region sequentially from the first and second edge regions to expose the underside of the centerpiece region;

the label further comprising a third ply having an underside and an opposed face and formed with a first edge region, a centerpiece region, and a second edge region, the centerpiece region being separated from the first and second edge regions by rows of perforations and wherein the first edge region, centerpiece region, and second edge region of the third ply are positioned in alignment over the first edge region, centerpiece region, and second edge region of the second ply;

wherein the third ply comprises a varnish.

* * * * *